Feb. 28, 1967
F. L. DALE
3,306,279
BARBECUE SKILLET
Filed May 19, 1965
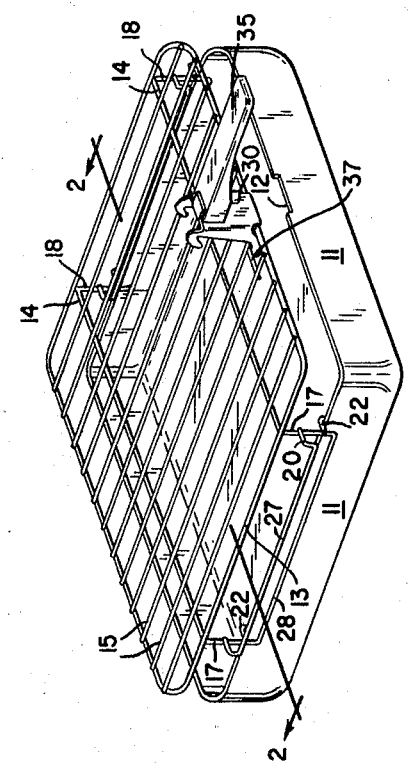
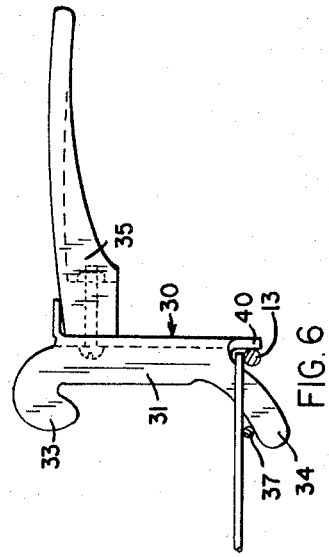
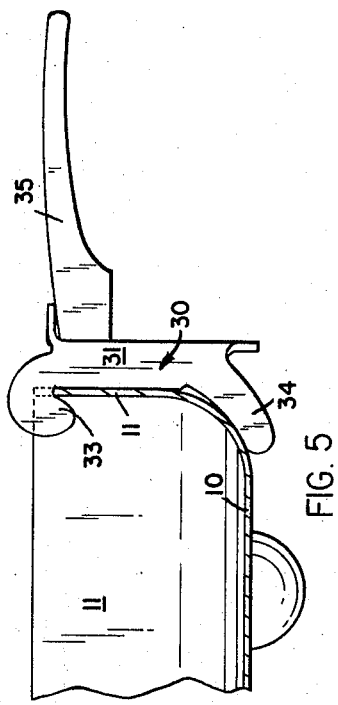
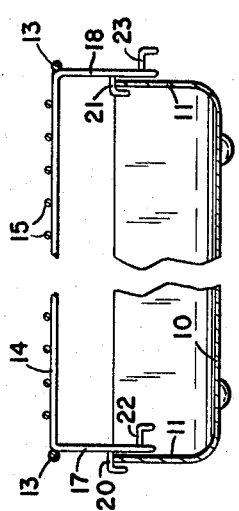
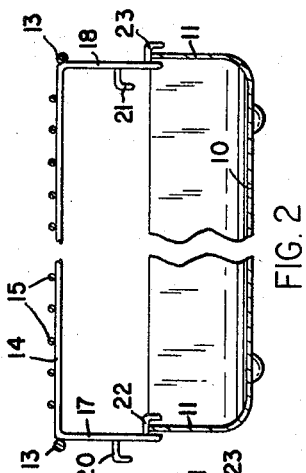
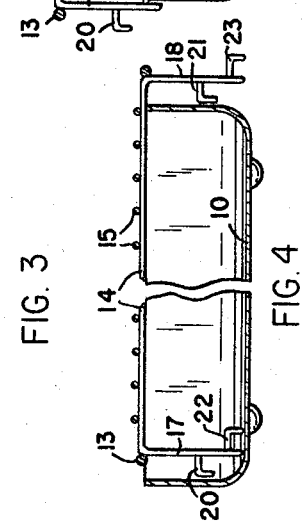
INVENTOR.
FRANK L. DALE.
BY
D. Emmett Thompson
HIS ATTORNEY.

United States Patent Office 3,306,279
Patented Feb. 28, 1967

3,306,279
BARBECUE SKILLET
Frank L. Dale, New York, N.Y., assignor to Timberland Products Company, Inc., Stamford, N.Y.
Filed May 19, 1965, Ser. No. 457,030
4 Claims. (Cl. 126—25)

This invention has to do in general with a barbecue cooking device.

The invention has as an object a manually manipulated barbecue cooking device embodying the combination of a skillet-type fire pan and a grill adapted to be mounted on and supported by the fire pan and embodying a unique, simple, low-cost structural arrangement by which the grill can be supported on the fire pan at different elevations relative thereto, the arrangement being provided with a detachable handle for manipulating both the fire pan and the grill.

The invention consists in the novel features and in the combinations and constructions hereinafter set forth and claimed.

In describing this invention, reference is made to the accompanying drawings in which like characters designate corresponding parts in all the views.

In the drawings—

FIGURE 1 is a perspective view of the barbecue cooking device showing the grill mounted on the fire pan in high position.

FIGURE 2 is a transverse sectional view taken on a line corresponding to line 2—2, FIGURE 1.

FIGURE 3 is a view similar to FIGURE 2 showing the grill positioned in medium or intermediate position.

FIGURE 4 is a view similar to FIGURES 2 and 3 showing the grill in the lowermost position.

FIGURE 5 is a fragmentary sectional view of the fire pan with the handle attached.

FIGURE 6 is a fragmentary sectional view of the grill showing the handle attached thereto.

The fire pan is of rectangular formation having a bottom wall 10 and upstanding side wall flanges 11, the upper edge of one of the side walls 11 is formed in its medial portion with a notch 12.

The grill is also of rectangular shape formed from a perimetrically extending rod 13 to which there are fixed a pair of cross rods 14 extending transversely of the grill formation. The grill is completed by a series of lengthwise extending rods 15 fixed at their ends to opposite sides of the perimetric rod 13 and also preferably fixed to the cross rods 14.

The grill is also formed on one side with a pair of depending posts 17, and at the opposite side with a pair of depending posts 18, the posts of each pair are spaced apart in a direction lengthwise of the grill, the posts 17, 18 being preferably integral downwardly extending portions of the transverse rods 14. The posts of each pair are spaced apart laterally of the grill comparable to the spacing of the opposite side flanges 11 of the fire pan.

The posts 17 are provided with outwardly extending downwardly facing hook members 20. The pair of posts 18 are formed with similar members 21 extending inwardly. The posts 17 are also provided with inwardly extending downwardly facing hook members 22, and the posts 18 with similar outwardly extending hook members 23. The hook members 22, 23 are located on the posts 17, 18 in downwardly spaced relation to the hook members 20, 21, see FIGURES 2, 3 and 4. The hook members 20, 21, including the downwardly extending portions thereof, are also spaced complemental to the spacing between opposite side flanges 11 of the fire pan. The hook members 20–23 serve to support the grill by engagement with the upper edges of opposite fire pan side flanges 11. Referring to FIGURES 1 and 2, the hook members 22, 23 are positioned on opposite side flanges 11 of the fire pan positioning the grill a substantial distance about the fire pan.

In FIGURE 3, the hook members 20, 21 are positioned on the upper edges of the fire pan flanges supporting the grill in intermediate or medium position above the fire pan. In FIGURE 4, the posts 18, with the hook members 21, 23 carried thereby, are positioned exteriorly of the side flanges, and the hook members 20, 22 carried by the posts 17 are positioned on the inside of the opposite flange 11. The posts 17, 18 have vertical dimension comparable with the depth of the side flanges 11. Accordingly, as shown in FIGURE 4, the grill is positioned directly on the top edges of the flanges 11.

These three vertical adjustments of the grill are permitted by the unique arrangement of the grill post supporting members 17, 18, and the hook members 20–23 carried thereby. Inasmuch as the pair of posts 17 are spaced from the pair of posts 18, complemental to the spacing of opposite side flanges 11 of the fire pan, and the hook members 20, 22 are likewise spaced from the hook members 21, 23 respectively, it will be apparent that upon raising the grill from the position shown in FIGURE 2 a slight distance and moving the grill to the right to align the posts 17 interiorly of the left hand flange 11, and the pair of posts 18 exteriorly of the opposite side flange 11 and lowering the grill, the hook members 20, 21 engage the opposite side flanges of the pan, as shown in FIGURE 3.

In like manner, when the pan is shifted further to the right to bring the hook members 20 inside of the left fire pan flange and the hook members 21 exteriorly of the opposite side, the grill can be lowered down to the lower most position.

Preferably, the pairs of hook members 20, 21, 22 and 23 are connected by integral tie members 27, and in like manner, the lower ends of the pairs of posts 17, 18 are connected by tie members 28.

Referring to FIGURES 5 and 6, a handle structure is provided for manually manipulating both the fire pan and the grill. This handle consists of a body portion 30 formed at its sides with flanges 31 adapted to be positioned against the exterior surface of a side flange 11 of the fire pan. These flanges 30 are provided at their upper ends with hook portions 33 adapted to be hooked over the upper edge of the flange 11. The flanges 30 are also formed with downwardly inclined arm portions 34 positioned to engage at the mergence between the bottom wall 10 and the side wall 11 of the fire pan. The spacing between the hook members 33 is comparable to the length of the notch 12 formed in one of the side flanges 11. The body 30 is provided with a suitable handle 35.

The grill is provided with a rod 37 positioned inwardly from the perimetric rod 13 medial of one side of the grill, the rod 37 extending in spaced parallel relation to the rod 13. This spacing is such that the arm portions 34 of the handle member may be inserted between the rods 13 and 37. The body 30 is formed with a downward extension 40 to provide a recess for the reception of the perimetric rod 13. With this arrangement, the handle is conveniently attached to the grill in a manner to provide firm and adequate support of the grill by the handle.

What I claim is:

1. A barbecue cooking device, a rectangular-shaped fire pan having upstanding side flanges, a grill adapted to be positioned on said fire pan, a pair of posts depending from opposite side edges of said grill, the posts of each pair being spaced apart in a direction lengthwise of the side edges of the grill, said pairs of posts being spaced apart in a direction transversely of the grill complemental to the spacing of the opposite side flanges of said fire pan, upper and lower laterally extending downwardly facing hook members fixed to each of said posts, the upper hook members fixed to the posts of one pair extending outwardly from the posts, and the lower hook members fixed to the posts of said pair extending inwardly, upper hook members fixed to the posts of said other pair extending inwardly therefrom, and the lower hook members fixed to the posts of said other pair extending outwardly therefrom, whereby the upper hook members fixed to said posts are adapted to engage the upper edges of the side flanges of said fire pan to support said grill in elevated relation to said fire pan, and upon lateral movement of said grill relative to said fire pan, said lower hook members engage the upper edges of the side flanges of said fire pan to support said grill at a higher elevation.

2. A barbecue cooking device as set forth in claim 1 wherein the lower ends of the posts of each of said pair are connected by a tie rod.

3. A barbecue cooking device as set forth in claim 1 wherein said upper and lower hook members on each pair of posts are connected by tie rods.

4. A barbecue cooking device as defined in claim 1 wherein said posts have vertical dimension comparable to the vertical dimension of the side flanges of said fire pan.

References Cited by the Examiner
UNITED STATES PATENTS

| | | | |
|---|---|---|---|
| 2,247,612 | 7/1941 | Haislip | 126—25 |
| 2,262,273 | 11/1941 | Ferrara | 126—9 X |
| 2,573,988 | 11/1951 | Saltzberg | 126—25 X |
| 2,780,215 | 2/1957 | Vacanti | 126—9 |
| 3,051,159 | 8/1962 | Hardy | 126—25 |
| 3,088,393 | 5/1963 | Huckabee | 126—25 X |

FREDERICK L. MATTESON, JR., *Primary Examiner.*

E. G. FAVORS, *Assistant Examiner.*